(12) United States Patent
Gruhlke et al.

(10) Patent No.: US 7,483,065 B2
(45) Date of Patent: Jan. 27, 2009

(54) MULTI-LENS IMAGING SYSTEMS AND METHODS USING OPTICAL FILTERS HAVING MOSAIC PATTERNS

(75) Inventors: Russell W. Gruhlke, Fort Collins, CO (US); Dale W. Schroeder, Scotts Valley, CA (US); John H. Stanback, Fort Collins, CO (US)

(73) Assignee: Aptina Imaging Corporation, Grand Cayman (KY)

( * ) Notice: Subject to any disclaimer, the term of this patent is extended or adjusted under 35 U.S.C. 154(b) by 535 days.

(21) Appl. No.: 11/016,376

(22) Filed: Dec. 15, 2004

(65) Prior Publication Data

US 2006/0125936 A1 Jun. 15, 2006

(51) Int. Cl.
*H04N 3/14* (2006.01)
*H04N 5/235* (2006.01)
(52) U.S. Cl. .................. 348/277; 348/222.1; 348/216.1
(58) Field of Classification Search ................. 348/277, 348/271
See application file for complete search history.

(56) References Cited

U.S. PATENT DOCUMENTS

| | | | |
|---|---|---|---|
| 4,876,591 A * | 10/1989 | Muramatsu | 348/236 |
| 5,159,453 A | 10/1992 | Dhein et al. | |
| 5,438,366 A | 8/1995 | Jackson et al. | |
| 5,852,502 A | 12/1998 | Beckett | |
| 6,611,289 B1 * | 8/2003 | Yu et al. | 348/265 |
| 6,788,338 B1 * | 9/2004 | Dinev et al. | 348/222.1 |
| 6,852,565 B1 * | 2/2005 | Zhao | 438/73 |
| 6,859,229 B1 * | 2/2005 | Suda | 348/273 |
| 7,110,034 B2 * | 9/2006 | Suda | 348/340 |
| 7,123,298 B2 * | 10/2006 | Schroeder et al. | 348/273 |
| 2003/0048493 A1 * | 3/2003 | Pontifex et al. | 358/514 |
| 2003/0197791 A1 * | 10/2003 | Ogino | 348/218.1 |
| 2003/0223004 A1 * | 12/2003 | Kubota et al. | 348/294 |
| 2004/0036010 A1 | 2/2004 | Hsieh et al. | |
| 2005/0285955 A1 * | 12/2005 | Utz et al. | 348/265 |

OTHER PUBLICATIONS

International Search Report Appln. No. PCT/US05/39249, dated Mar. 27, 2007.

* cited by examiner

*Primary Examiner*—Lin Ye
*Assistant Examiner*—Hung H Lam
(74) *Attorney, Agent, or Firm*—Ratner Prestia

(57) ABSTRACT

Imaging systems and methods are provided. One exemplary system incorporates multiple lenses that are individually configured to receive visible light from an object to be imaged, and to direct this light upon a corresponding sensor array. Luminance information is then derived from signals generated in one or more of the sensor arrays. When chrominance information is desired, an optical filter is interposed between a lens and the corresponding sensor array. The mosaic pattern contained in the optical filter is tailored to provide advantageous chrominance information. One or more such filters with different mosaic patterns may be employed. The luminance and chrominance information obtained from the sensor arrays are combined to generate an image of the object.

24 Claims, 9 Drawing Sheets

MULTI-LENS IMAGING SYSTEMS AND METHODS USING OPTICAL FILTERS HAVING MOSAIC PATTERNS

DESCRIPTION OF THE RELATED ART

Image capture devices such as digital cameras, desktop cameras attached to personal computers, and cameras built into mobile telephones, typically have a single lens through which light that is received from an object to be photographed, is directed on to a charge-coupled device (CCD) sensor array, or alternatively, a complementary metal oxide semiconductor (CMOS) sensor array. Because most of these cameras are color cameras, a pixilated color filter is interposed between the lens and the sensor array. The color filter normally contains an array of red, green, and blue filter elements, often configured in a mosaic pattern that is referred to in the industry, as a Bayer pattern. Each element of the color filter, regardless of the color transmitted through the element, is aligned with a sensor element located in the sensor array. Such an alignment enables color pixel information to be captured in the sensor array. This color pixel information is then processed to generate a color image of the object.

The single-lens camera suffers from several handicaps. Some examples of such handicaps are: limited image resolution, poor color imaging, and improper luminance imaging. Typically, image resolution limitations are a result of using a single sensor array containing a limited number of sensor elements. Image resolution can be improved by increasing the number of sensor elements, and such a solution has been used in several cameras where the density of sensor elements contained in the sensor array has been increased. While more needs to be done in improving sensor element density even further, it is also desirable to find alternative solutions to improving imaging resolution.

Poor color imaging is generally a result of limited spectral bandwidth in the sensor elements of a sensor array. One technique that has been employed to overcome spectral bandwidth limitation involves combining color image information obtained from one element of the sensor array with additional color information obtained from neighboring sensor elements. Unfortunately, this technique often leads to color defects known as "color artifacts" that are created when the physical spacing between sensor elements, termed as "pixel pitch," is of the same order as the spatial pitch of the image content. This phenomenon, which is also referred to sometimes as "aliasing," leads to undesirable image distortion and poor color imaging.

Turning to the aspect of improper luminance imaging, conventional cameras are handicapped to some extent because light entering the camera lens has to traverse a color filter before striking the sensor array. Consequently, each of the sensor elements receives light of only a certain color, rather than receiving wide-spectrum light that would provide more accurate image luminance information. For example, a first sensor element receives light of only a green color, while a second sensor receives light of only a red color, while a third sensor receives light of only a blue color. The three color pixels obtained from these three elements are then processed to obtain image luminance information. Such a process does not accurately reproduce the luminance information of the imaged object.

It can therefore be appreciated that it would be desirable to have imaging systems and methods that overcome one or more of the drawbacks identified above.

SUMMARY OF THE INVENTION

In accordance with the invention, imaging systems generally incorporate multiple lenses that are individually configured to receive visible light from an object to be imaged, and to direct this light upon a corresponding sensor array. Luminance information is then derived from signals generated in one or more of the sensor arrays.

When chrominance information is desired, an optical filter is interposed between a lens and the corresponding sensor array. The mosaic filter pattern contained in the optical filter is tailored to provide advantageous chrominance information. One or more such filters with different mosaic filter patterns may be employed.

Clearly, some embodiments of the invention may exhibit advantages in addition to, or in lieu of, those mentioned above. Additionally, other systems, methods, features and/or advantages of the present invention may become apparent to one with skill in the art upon examination of the following drawings and detailed description. It is intended that all such additional systems, methods, features and/or advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The various embodiments describe systems and methods for imaging. The imaging systems generally incorporate multiple lenses that are individually configured to receive visible light from an object to be imaged and to direct this light upon a corresponding sensor array. Luminance information is then derived from signals generated in one or more of the sensor arrays. When chrominance information is desired, an optical filter is interposed between a lens and the corresponding sensor array. The mosaic filter pattern contained in the optical filter is tailored to provide advantageous chrominance information. One or more such filters with different mosaic filter patterns may be employed.

In one embodiment of an imaging system, chrominance information derived from multiple sensors is processed to generate an image of the object, while in a second embodiment, the luminance and chrominance information derived from multiple sensors are combined to generate an image of the object. A few such embodiments are described below. It will be understood that colors such as green, blue, and red are mentioned in the exemplary embodiments below for purposes of explanation and are not intended to limit the invention to these particular colors. Consequently, in other embodiments, other colors will be used.

Figure 1:
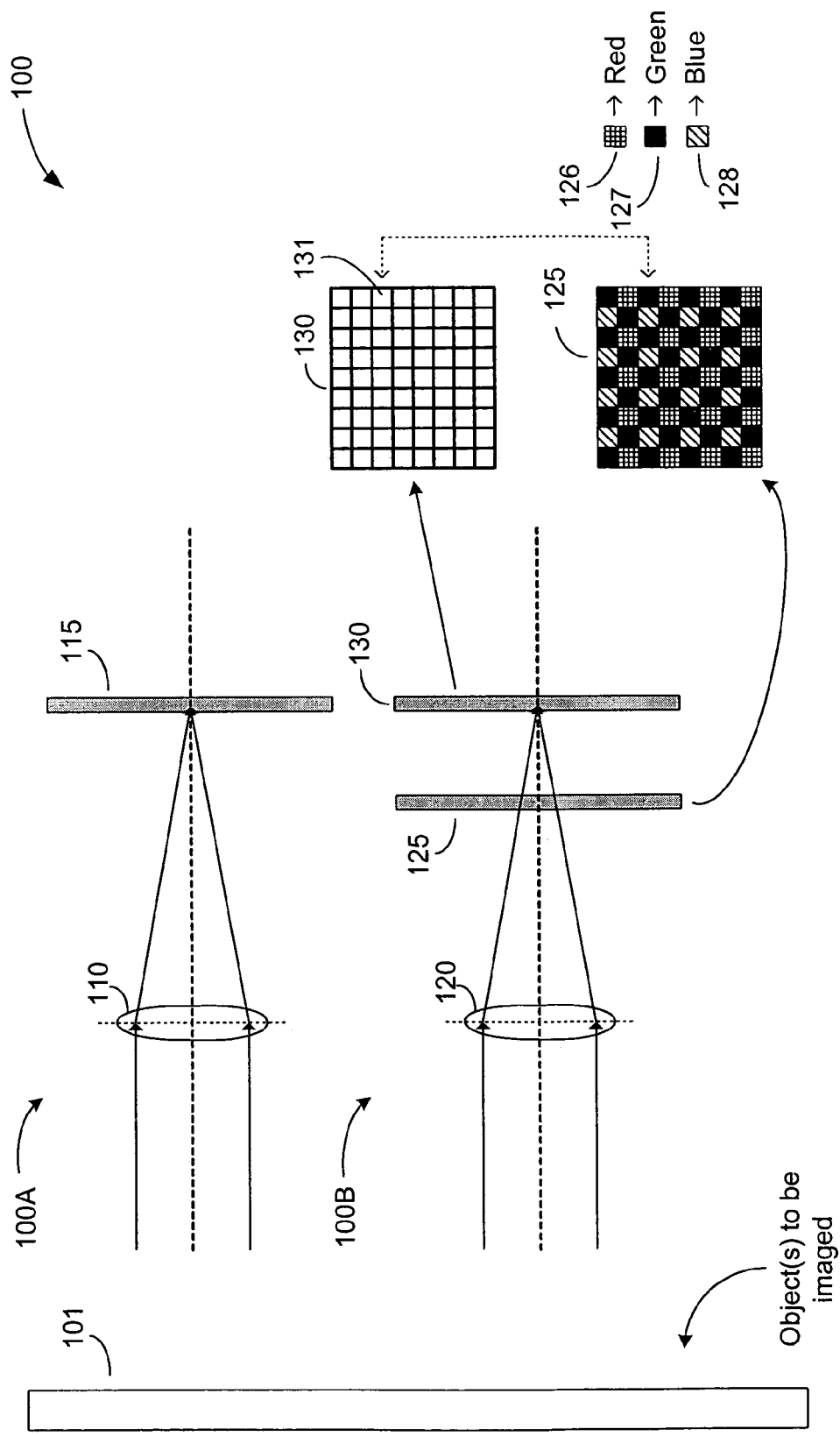
FIG. 1 shows an exemplary two-lens imaging system using a first lens system to obtain luminance information together with a second lens system to obtain chrominance information of an object to be imaged.

FIG. 1 shows an exemplary two-lens imaging system 100 that uses a first lens system 100A to obtain luminance information of an object 101 to be imaged, together with a second lens system 100B to obtain chrominance information of the object 101.

Lens 110 receives a full spectrum of visible light from object 101 and directs this light onto a luminance sensor array 115. Luminance sensor array 115 is a pixilated array that responds to the incident light by generating luminance signals in the form of multiple pixels. Lens system 100A provides good light flux sensitivity even when object 101 is subjected to low illuminance conditions. Since the human eye is more sensitive to spatial variations in luminance as compared to chrominance, luminance sensor array 115 may be configured for maximum luminance accuracy without any constraints from chrominance parameters.

Lens 120 also receives the full spectrum of visible light from object 101 and directs this light towards a chrominance sensor array 130. Interposed between lens 120 and chrominance sensor array 130 is an optical filter 125 that selectively propagates one or more sub-spectrums of the full spectrum of visible light. For example, in the embodiment illustrated by FIG. 1, optical filter 125 is a Bayer filter that has a Bayer mosaic pattern. This mosaic pattern contains several red filter elements that are illustrated using red symbol 126, several green filter elements illustrated using green symbol 127, and several blue filter elements illustrated using blue symbol 128.

Consequently, optical filter 125 propagates three sub-spectrums of light. The first sub-spectrum contains wavelengths corresponding to red-colored light, the second sub-spectrum to green-colored light, and the third sub-spectrum to blue-colored light.

Each of the filter elements of optical filter 125 is optically aligned to a corresponding sensor element in chrominance sensor array 130, thereby providing one pixel of chrominance information from each sensor element. One example of such a sensor element is sensor element 131, which, in this example, provides one pixel of green light information.

The pixilated chrominance information obtained from chrominance sensor array 130 is combined with the pixilated luminance information obtained from luminance sensor array 115, to generate an image of the object. The resolution of the image is proportional to the number of pixels contained in the two sensor arrays, and is therefore higher than the resolution that is typically obtained from a single-lens system using a single sensor array.

It will be understood that the labels "luminance sensor array" and "chrominance sensor array" are used as a matter of convenience to describe the functionality of these sensor arrays, and are not intended to limit the physical characteristics of the individual sensor arrays. For example, in one embodiment, the "luminance" sensor array can be physically identical to the "chrominance" sensor array. Consequently, either one of the two arrays can be used to obtain luminance information by directing unfiltered, visible light upon the sensor array. Similarly, either one of these same two arrays can be used to obtain chrominance information by directing only certain colors of light upon the sensor array.

On the other hand, in an alternative embodiment, the two sensor arrays are physically different from one another. For example, the sensor elements of the "chrominance" sensor array are selected to provide a maximum response to light of a certain color that is incident upon the array rather than to a full spectrum, visible light, while the sensor elements of the "luminance" sensor array are selected to be maximally responsive to the full spectrum, visible light rather than light of a particular color.

Figure 2:
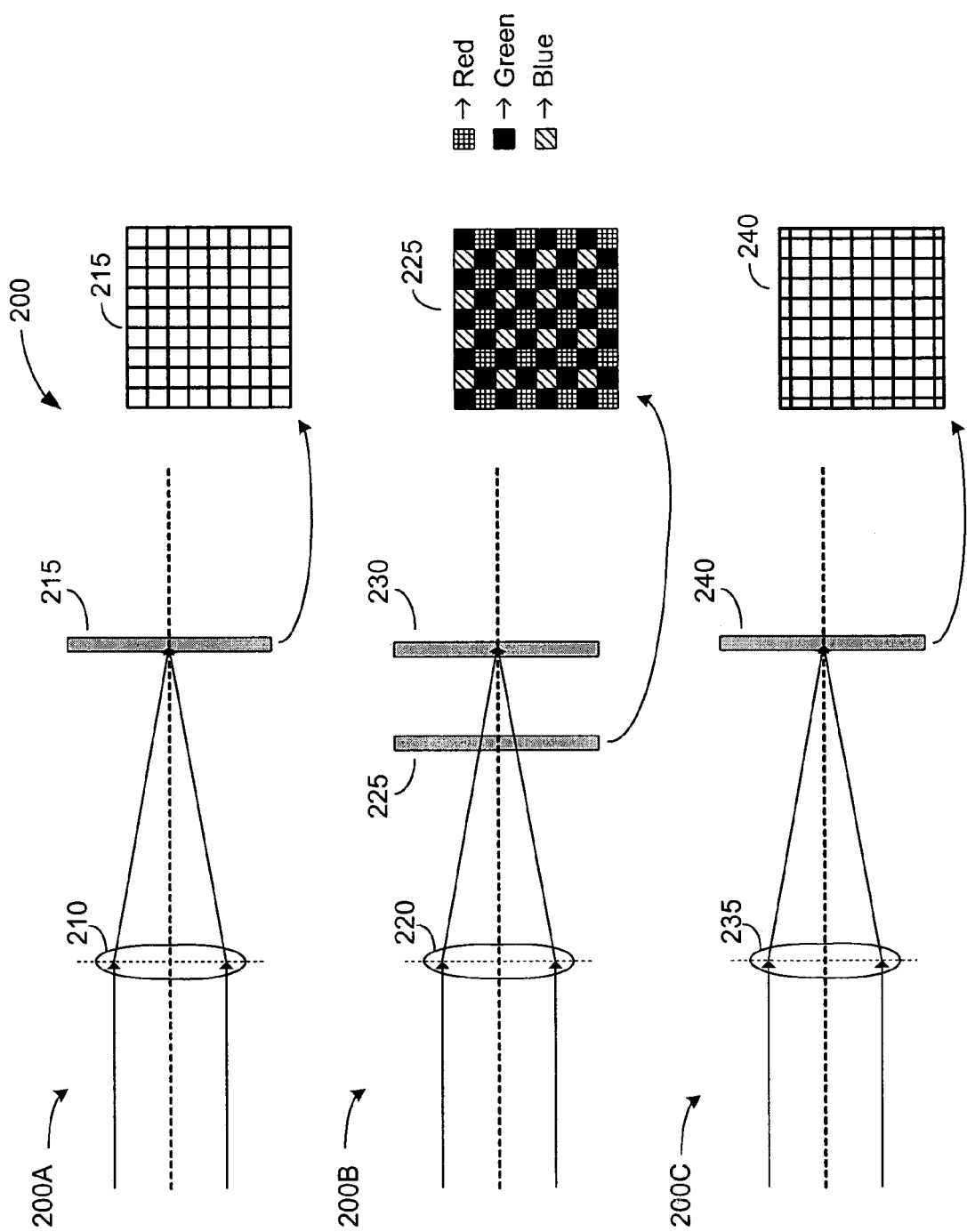
FIG. 2 shows an exemplary three-lens imaging system that combines the two-lens imaging system of FIG. 1 with a third lens system to obtain additional luminance information.

FIG. 2 shows an exemplary three-lens imaging system 200 that uses a first lens system 200A to obtain luminance information of one or more objects to be imaged (not shown), together with a second lens system 200B to obtain chrominance information of the object. Lens systems 200A and 200B are similar to lens systems 100A and 100B respectively of FIG. 1. A third lens system 200C is used to obtain additional luminance information of the object. In this exemplary embodiment, lens system 200C includes a luminance sensor array 240 having the same number of sensor elements as luminance sensor array 215 of lens system 200A. However, the sensor elements contained in luminance sensor array 240 are spatially offset with reference to the sensor elements contained in luminance sensor array 215. Consequently, the pixilated luminance information obtained from these two sensors complement each other to provide increased resolution not merely from the doubling of sensor elements in comparison to that contained in a single sensor array, but also from the increased luminance information obtained at different pixel locations as a result of the spatial offset. In other embodiments, the number of sensor elements in each of the three sensors may be non-identical.

Figure 3:
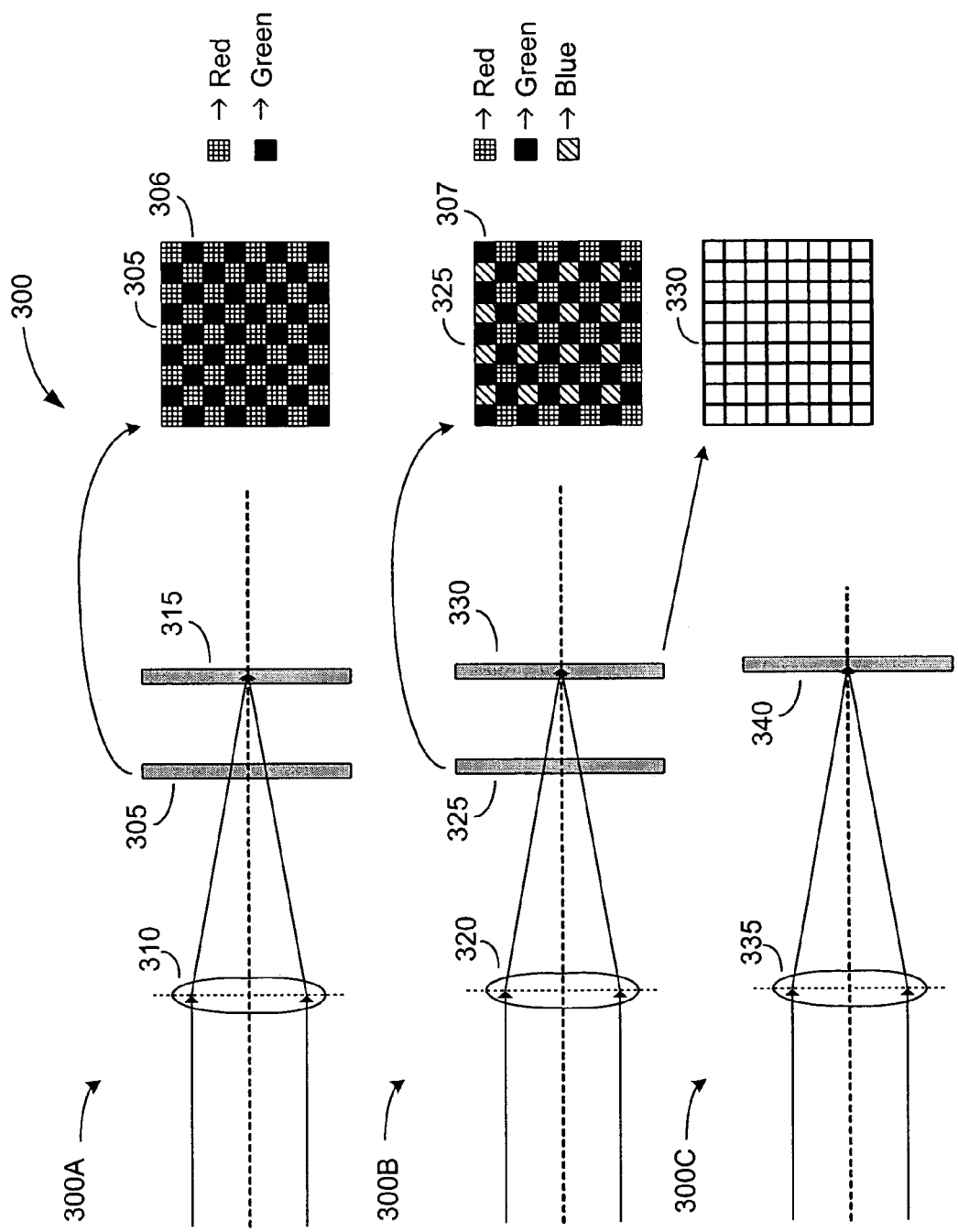
FIG. 3 shows an exemplary three-lens imaging system that combines the two-lens imaging system of FIG. 1 with a third lens system to obtain additional chrominance information.

FIG. 3 shows another exemplary three-lens imaging system 300 that uses a first lens system 300C to obtain luminance information of an object to be imaged (not shown), together with a second lens system 300B to obtain chrominance information of the object. Lens systems 300C and 300B are similar to lens systems 100A and 100B respectively of FIG. 1. A third lens system 300A is used to obtain additional chrominance information of the object. In this exemplary embodiment, optical filter 305 is a red-green filter with a mosaic pattern that is different from that of optical filter 325, which is a red-green-blue Bayer filter. Additionally, the mosaic pattern of optical filter 305 may be spatially offset with reference to that of optical filter 325. For example, green filter element 306 is offset with reference to green filter element 307. Consequently, certain chrominance information obtained from sensor array 315, which is optically coupled to optical filter 305, complements chrominance information obtained from sensor array 330. For example, the sensor elements of sensor array 315 receiving green light are spatially offset with reference to the sensor elements of sensor array 330 receiving green light. Consequently, green pixel information that is obtained by combining information from the two sensor arrays provides higher resolution than that obtained from a single sensor array of a single-lens system.

Figure 4:
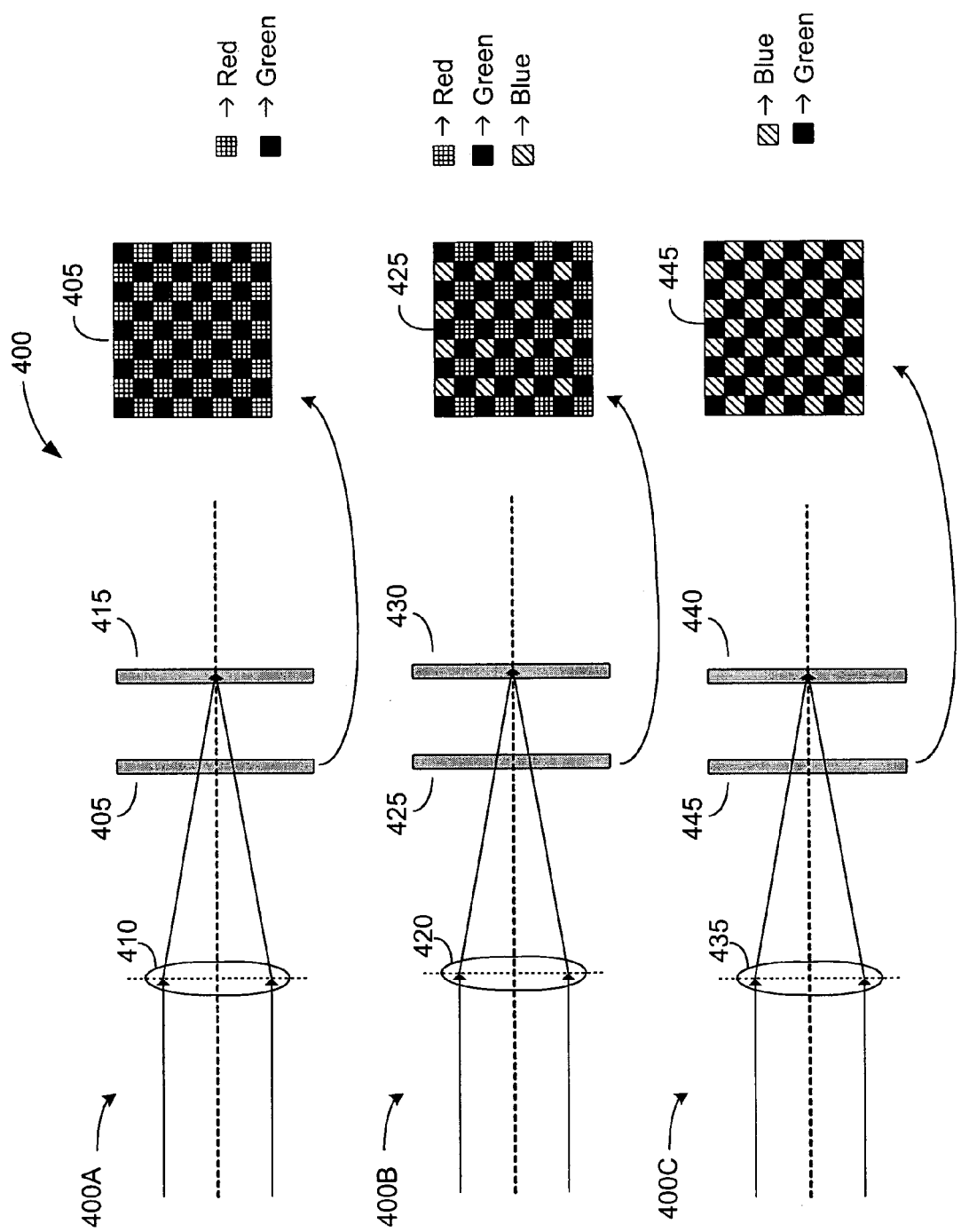
FIG. 4 shows an exemplary three-lens imaging system that uses three optical filters, each of which is configured to have a unique array of filter elements.

FIG. 4 shows a three-lens imaging system 400 that uses three lens systems, 400A, 400B, and 400C to obtain three sets of chrominance information of an object to be imaged (not shown). Several exemplary embodiments of the three-lens imaging system 400 are disclosed below.

In a first embodiment, the three optical filters 405, 425, and 445 have mosaic patterns that differ from one another. Optical filter 405 is a red-green filter with a mosaic pattern that is different from that of optical filter 425, which is a red-green-blue Bayer filter. Optical filter 445 is yet another variant, having a blue-green mosaic pattern that is different from the mosaic patterns contained in optical filters 405 and 425. The three sets of information obtained from sensors 415, 430, and 440 are combined to generate an image of the object.

In a second embodiment of FIG. 4, the three optical filters 405, 425, and 445 are similar to one another. For example, all three optical filters are identical Bayer color filters, each of which has as many pixel elements as that contained in an optical filter of a prior-art single-lens system. However, due to super-resolution, the depth of field of the three-lens imaging system 400 becomes significantly superior to that of the prior-art single-lens system. For example, the depth of field of the three-lens imaging system 400 can range from 0.11 mm to infinity, in comparison to the depth of field of a prior-art single-lens system ranging from 0.30 mm to infinity. Super-resolution is an image processing method wherein "n" individual images are superimposed upon one another to improve resolution by a factor of (n) ½. For example, when super-resolution is utilized, the resolution obtained from the three-lens imaging system 400 is improved by a factor of (3) ½ in comparison to the resolution obtained from a prior-art single-lens-system.

In a variant of the second embodiment above, the dimensions of each of the three optical filters 405, 425, and 445, as well as of each corresponding sensors 415, 430, and 440, is increased such that the depth of field of the three-lens imaging system 400 is the same as the depth of field of a prior-art single-lens system. Because the dimensions of each individual filter element that is contained inside each of the optical filters, as well as that of each individual sensor element contained inside each of the sensor arrays, has remained unchanged in spite of the increased overall dimensions of the optical filters/sensor arrays, it will be understood that the overall pixel count increases significantly. Consequently, the resolution of the three-lens imaging system 400 is significantly higher than that of a prior-art single-lens system.

In a third embodiment of FIG. 4, the three lens systems 400A, 400B, and 400B incorporate off-axis imaging in conjunction with on-axis imaging. One or more of lenses 410, 420, and 435 are configured to provide an optimum modulation transfer function (MTF) at an off-axis location on a corresponding one of sensors 415, 430, and 440. More details of such a system can be obtained from co-pending patent application titled "Imaging systems and methods," (Russ Gruhlke et al.), which is herein incorporated by reference in its entirety.

Figure 5:
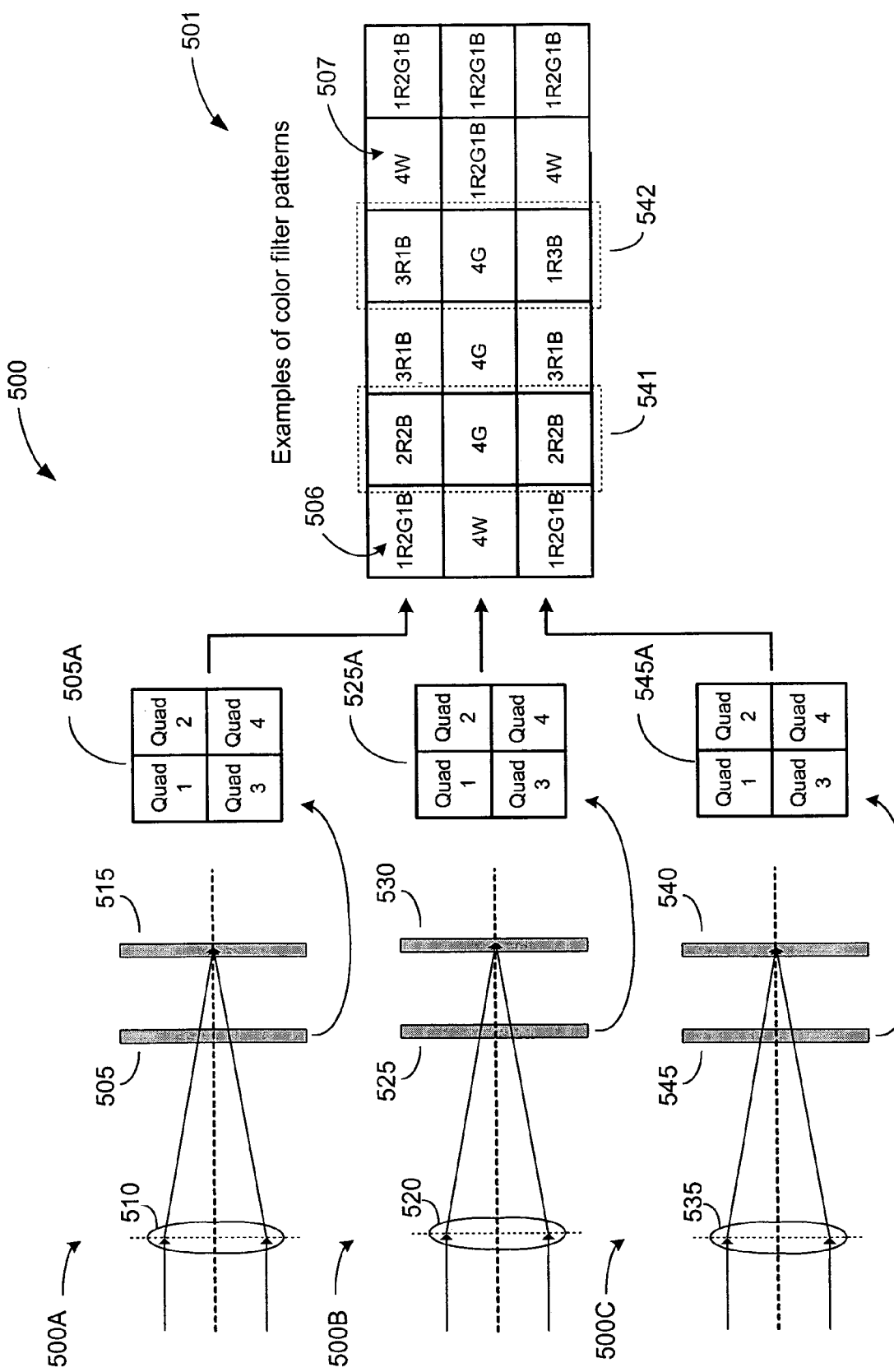
FIG. 5 shows an exemplary three-lens imaging system that uses three optical filters, each of which is configured as a quad-sectional filter having a unique array of filter elements.

FIG. 5 shows an exemplary three-lens imaging system 500 that uses three lens systems, 500A, 500B, and 500C to obtain three sets of chrominance information of an object to be imaged (not shown). In a first embodiment, each of the three optical filters 505, 525, and 545 incorporates one or more four-quadrant filters where each of the quadrants is configured to propagate a sub-spectrum of incident light. For example, the first quadrant of four-quadrant filter 505A may be configured to propagate red light, the second quadrant to propagate green light, the third quadrant to propagate green light also, and the fourth quadrant to propagate blue light. Such a pattern is depicted in box 506 of a color filter pattern table 501 that illustrates a few examples of such combinations that are embodied in the three four-quadrant filters 505A, 525A, and 545A. Box 507 depicts a four-quadrant combination that is configured to propagate the full spectrum of visible light through each of the four quadrants. In another embodiment, only one of the four-quadrants is configured to propagate the full spectrum of visible light.

Drawing attention to dotted box 541 of color filter pattern table 501, it can be seen that four-quadrant filter 505A has a red-red-blue-blue (2R2B) quadrant configuration, while four-quadrant filter 525A has a green-green-green-green (4G) quadrant configuration, and four-quadrant filter 545A has a red-red-blue-blue (2R2B) quadrant configuration. Similarly, dotted box 542 provides another example where four-quadrant filter 505A has a red-red-red-blue (3R1B) configuration, four-quadrant filter 525A has a green-green-green-green (4G) quad configuration, and four-quadrant filter 545A has a red-blue-blue-blue (1R3B) quad configuration.

Figure 6:
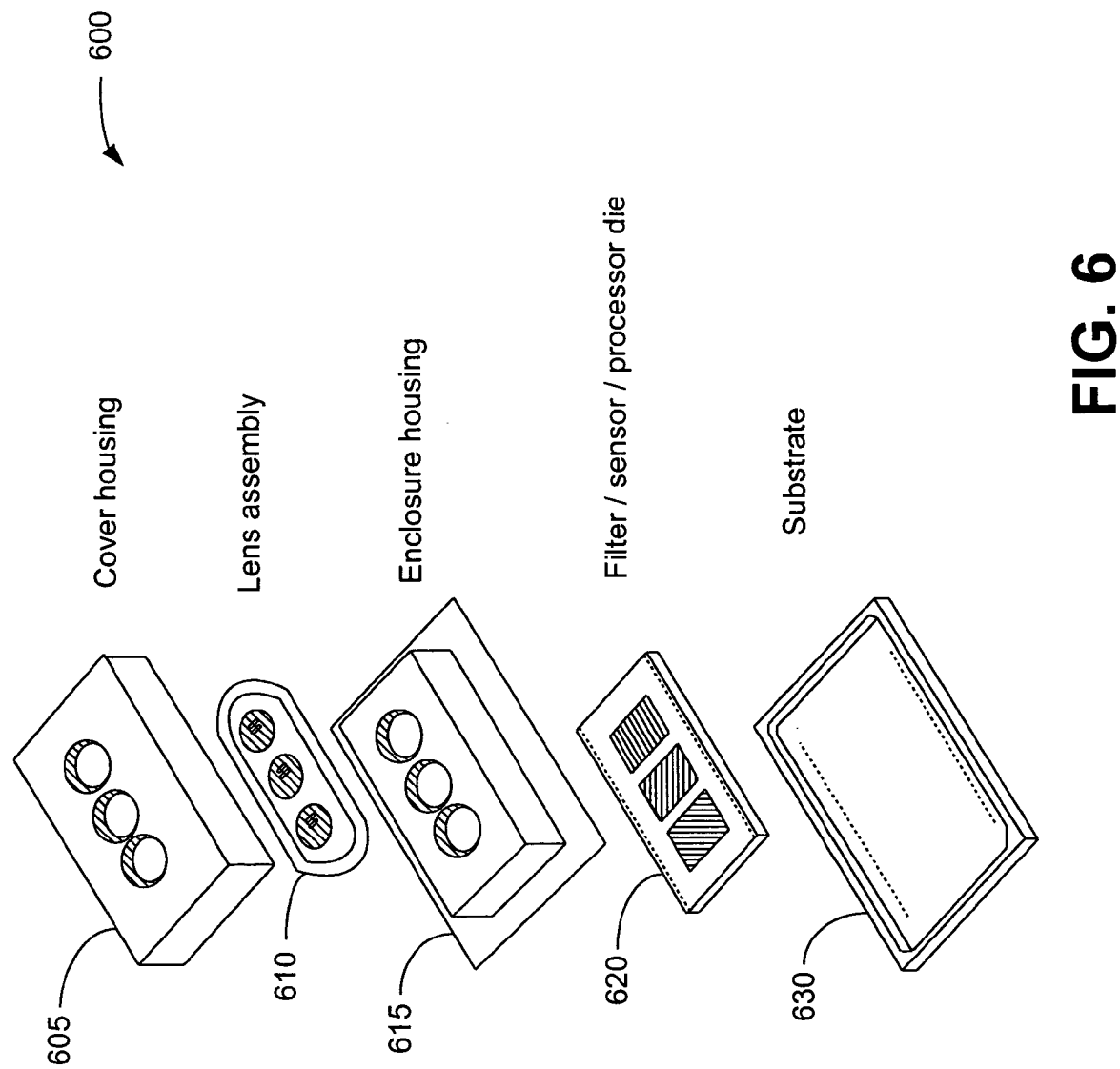
FIG. 6 shows a few individual components that comprise an exemplary three-lens imaging system assembly.

FIG. 6 shows a few individual components that constitute an exemplary three-lens imaging system assembly 600. The lens assembly 610 contains three lenses.

Cover housing 605 is disposed upon enclosure housing 615, enclosing lens assembly 610 therein. The assembled three elements are then further disposed upon a die 620, which is then further disposed upon a substrate 630.

Die 620 contains three color filters as described associated with the three lens systems in the various exemplary embodiments above. The three filters are optically aligned to the three lenses in lens assembly 610. Die 620 may further house three sensor elements, each of which are also optically aligned to the three lenses of lens assembly 610. Die 620 may further house one or more computing circuits to process the three signals from the three sensor elements and to generate the composite image.

Additional aspects of system 600, such as external connections, electrical circuits, mechanical fasteners, and mounting hardware have been omitted in FIG. 6 for the sake of brevity.

Figure 7:
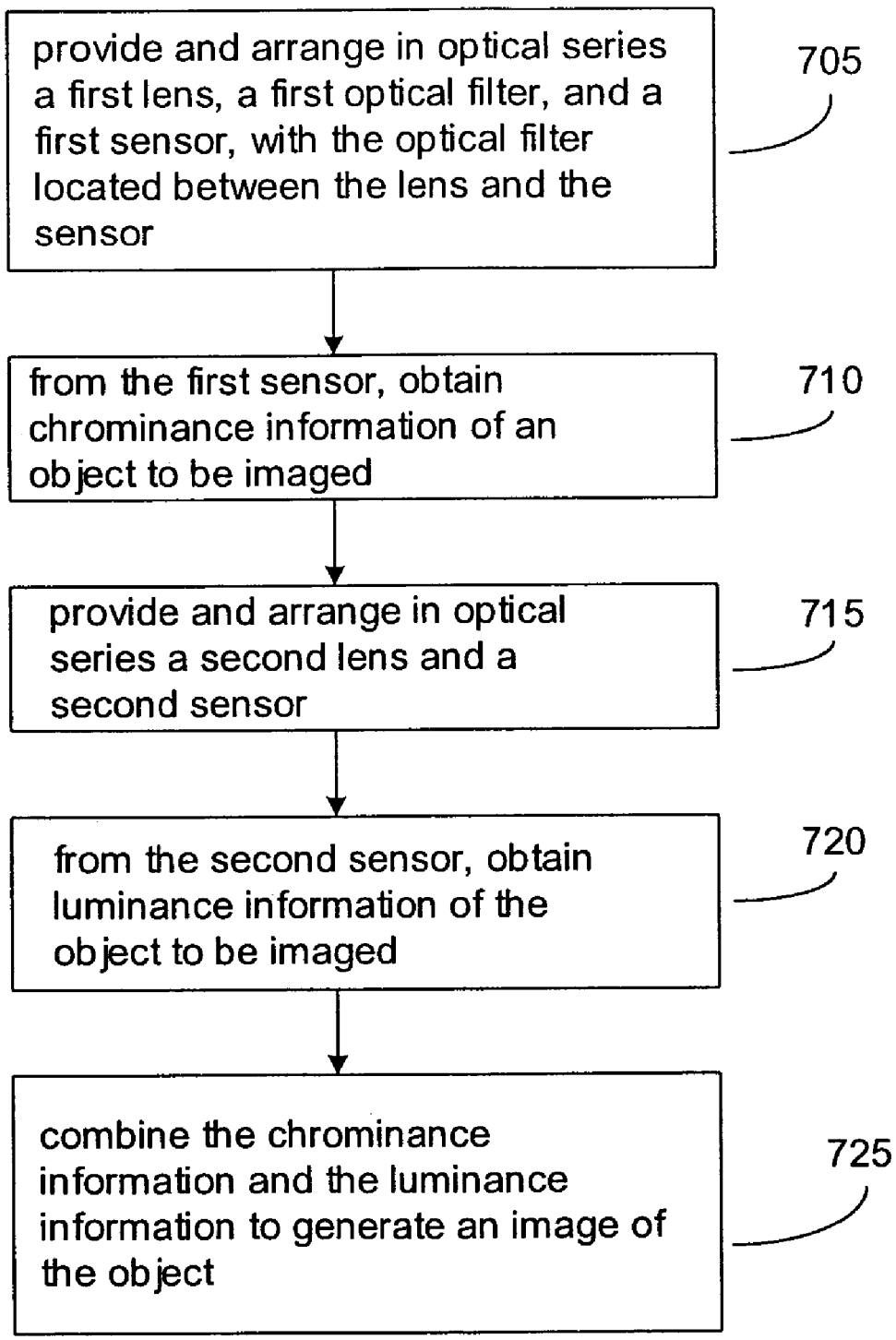
FIG. 7 shows a flowchart of a method for generating an image from a two-lens system.

FIG. 7 shows a flowchart of a method for generating an image from a two-lens system, such as for example, system 100 of FIG. 1. In block 705, a first lens, a first optical filter, and a first sensor are provided. These three components are arranged in optical series, with the optical filter located between the lens and the sensor. Visible light entering the first lens from an object to be imaged is directed on to the first optical filter that is arranged in optical alignment with the first lens. The visible light is filtered by the first optical filter in accordance with the mosaic pattern of the filter. For example, if the first optical filter is a Bayer filter, the mosaic pattern provides red-green-blue filtering in the Bayer pattern. The filtered light is propagated on to the first sensor.

In block 710, pixilated chrominance information relating to the light pattern incident upon the first sensor is obtained from the first sensor. In block 715, a second lens and a second sensor are provided and arranged in optical series. Visible light entering the second lens from the object to be imaged is directed directly on to the second sensor with no filtering. In block 720, pixilated luminance information of the unfiltered spectrum of visible light is obtained from the second sensor. Such an arrangement provides optimal light flux sensitivity in the imaging system even when the object is subject to low-light exposure.

In block 725, the pixilated chrominance information obtained from the first sensor is combined with the pixilated luminance information obtained from the second sensor to generate an image of the object.

Figure 8:
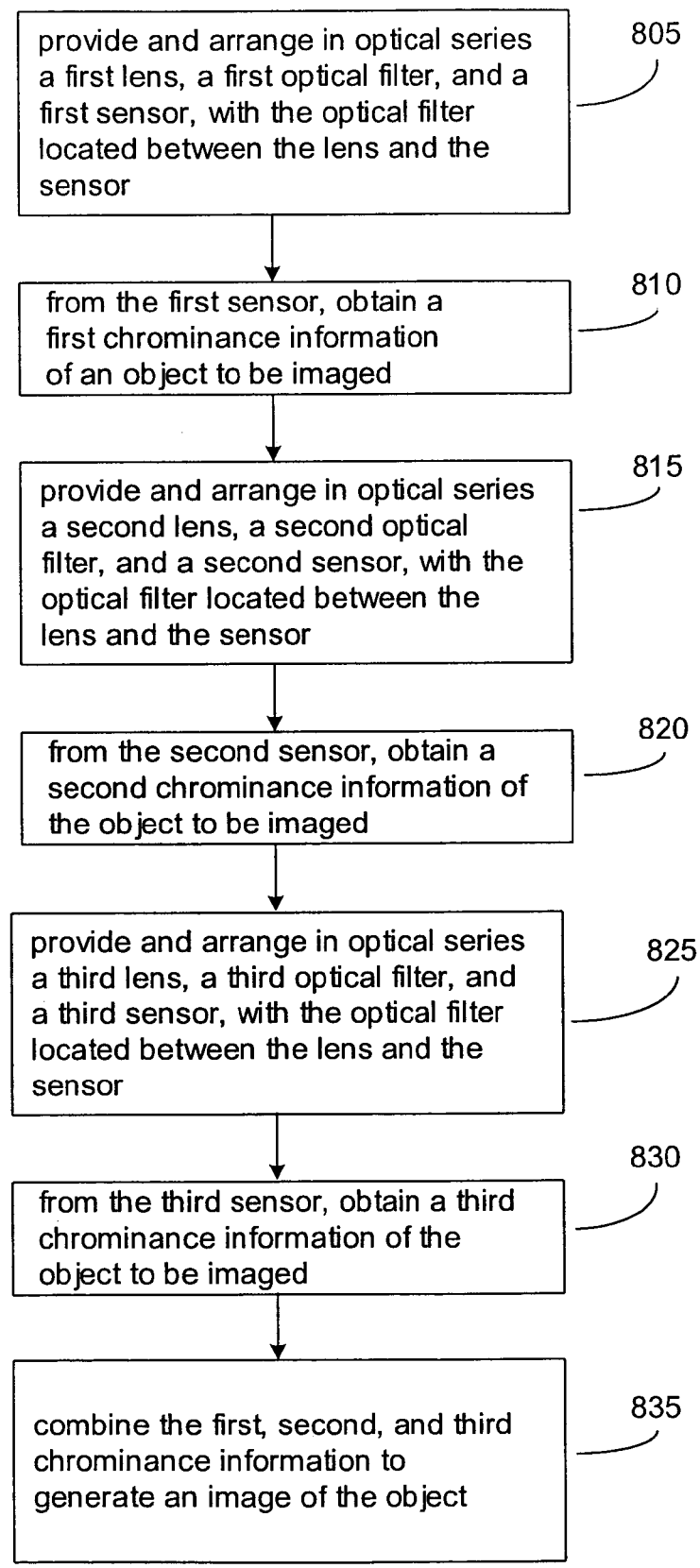
FIG. 8 shows a flowchart of a method for generating an image from a three-lens system where each of the three lens systems generates chrominance information.

FIG. 8 shows a flowchart of a method for generating an image from a three-lens system, such as for example, system 400 of FIG. 4. In block 805, a first lens, a first optical filter, and a first sensor are provided. These three components are arranged in optical series, with the optical filter located between the lens and the sensor. Visible light entering the first lens from an object to be imaged is directed on to the first optical filter that is arranged in optical alignment with the first lens. The visible light is filtered by the first optical filter in accordance with the mosaic pattern of the filter. For example, if the first optical filter is a red-green filter, the mosaic pattern provides red-green filtering. The filtered light is propagated on to the first sensor. In block 810, chrominance information relating to the incident first pattern of light is obtained from the first sensor.

In block 815, a second lens, a second optical filter, and a second sensor are provided. These three components are arranged in optical series, with the optical filter located between the lens and the sensor. Visible light entering the second lens from the object to be imaged is directed on to the second optical filter that is arranged in optical alignment with the second lens. The visible light is filtered by the second optical filter in accordance with the mosaic pattern of the filter. For example, if the second optical filter is a Bayer filter, the mosaic pattern provides red-green-blue Bayer mosaic filtering. The filtered light is propagated on to second sensor. In block 820, chrominance information relating to the incident second pattern of light is obtained from the second sensor.

In block 825, a third lens, a third optical filter, and a third sensor are provided.

These three components are arranged in optical series, with the optical filter located between the lens and the sensor. Visible light entering the third lens from the object to be imaged is directed on to the third optical filter that is arranged in optical alignment with the third lens. The visible light is filtered by the third optical filter in accordance with the mosaic pattern of the filter. For example, if the third optical filter is a blue-green filter, the mosaic pattern provides blue-green mosaic filtering. The filtered light is propagated on to third sensor. In block 830, chrominance information relating to the incident third pattern of light is obtained from the third sensor. In block 835, the first, second, and third chrominance information is combined to generate an image of the object.

Figure 9:
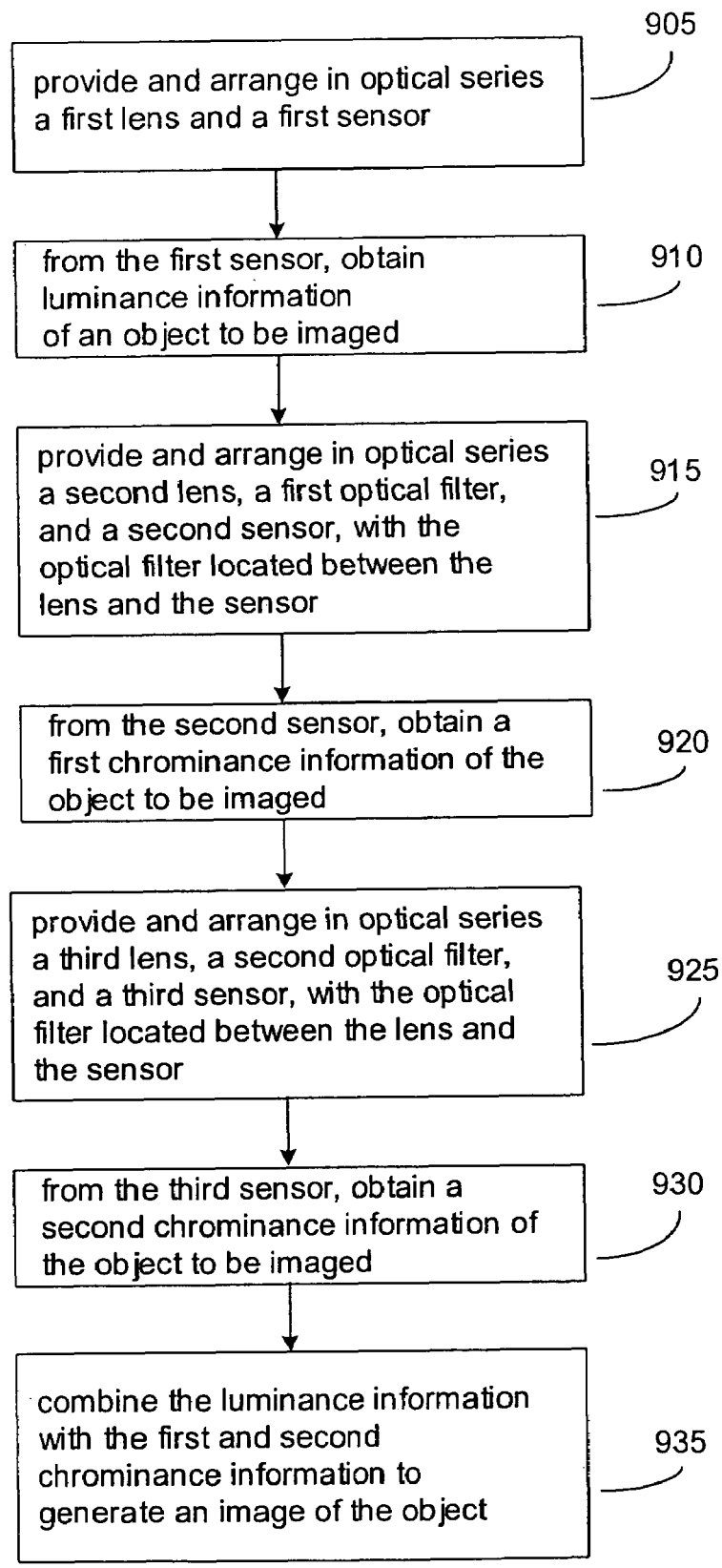
FIG. 9 shows a flowchart of a method for generating an image from a three-lens system where one of the lens system generates luminance information, and each of the other two lens systems generates chrominance information.

FIG. 9 shows a flowchart of a method for generating an image from a three-lens system, such as for example, system 300 of FIG. 3. Persons of ordinary skill in the art will recognize the various blocks of FIG. 9 in light of the disclosure above.

Consequently, in the interests of brevity the above-mentioned explanation will not be repeated herein.

The above-described embodiments are merely set forth for a clear understanding of the principles of the disclosure. Many variations and modifications may be made without departing substantially from the disclosure. All such modifications and variations are included herein within the scope of this disclosure.

We claim:

1. An imaging system comprising:
   a first luminance sensor array operative to produce first pixelated luminance information from a full spectrum of visible light;
   a first chrominance sensor array operative to produce first pixelated chrominance information from a first set of colors of visible light;
   a second chrominance sensor array operative to produce second pixelated chrominance information from a second set of colors of visible light;
   a first filter optically coupled to the first chrominance sensor array having a first mosaic pattern using the first set of colors; and
   a second filter optically coupled to the second chrominance sensor array having a second mosaic pattern using the second set of colors, at least one of the colors in one of the first set or the second set being different from the colors in the other one of the first set or the second set, wherein the first pixelated luminance information and the first and second pixelated chrominance information are combined to generate an image of an object.

2. The imaging system of claim 1, further comprising:
   a first lens configured to receive the full spectrum of visible light from the object to be imaged and operative to direct the full spectrum of visible light at the first luminance sensor array; and
   a second lens configured to receive the full spectrum of visible light from the object to be imaged, wherein the first filter is optically arranged in series with the second lens to receive the full spectrum of visible light directed by the second lens upon the first filter, and operative to propagate the first set of colors of visible light on to the first chrominance sensor array.

3. The imaging system of claim 2, wherein the first filter is a Bayer color filter operative to propagate at least three sub-spectrums corresponding to red, green, and blue light; and wherein the first chrominance sensor array is operative to produce chrominance information corresponding to at least one red pixel, one green pixel, and one blue pixel.

4. The imaging system of claim 2, wherein the first optical filter comprises a four-quadrant filter.

5. The imaging system of claim 4, wherein a first quadrant of the four-quadrant filter propagates light of a first color and a second quadrant of the four-quadrant filter propagates light of a second color.

6. The imaging system of claim 4, wherein at least one of four quadrants of the four-quadrant filter is operative to propagate the full spectrum of visible light.

7. The imaging system of claim 1, wherein the second filter includes a Bayer color filter operative to propagate at least three sub-spectrums of visible light, the three sub-spectrums including the second set of colors of visible light that is incident upon the second chrominance sensor array.

8. The imaging system according to claim 1, wherein the first mosaic pattern includes at least one additional color relative to the second mosaic pattern.

9. An imaging system comprising:
   a first chrominance sensor array operative to produce first pixelated chrominance information from a first set of colors of visible light;
   a second chrominance sensor array operative to produce second pixelated chrominance information from a second set of colors of visible light;
   a first filter optically coupled to the first chrominance sensor array having a first mosaic pattern using the first set of colors; and
   a second filter optically coupled to the second chrominance sensor array having a second mosaic pattern using the second set of colors, at least one of the colors in one of the first set or the second set is different from the colors in the other one of the first set or the second set, wherein the first and second pixelated chrominance information are combined to generate an image of an object.

10. The imaging system of claim 9, further comprising:
    a first lens configured to receive a full spectrum of visible light from an object to be imaged, the first filter optically arranged in series with the first lens to receive the full spectrum of visible light directed by the first lens upon the first filter, and operative to propagate the first set of colors of visible light on to the first chrominance sensor array;
    a second lens configured to receive the full spectrum of visible light from the object to be imaged, the second filter optically arranged in series with the second lens to receive the full spectrum of visible light directed by the second lens upon the second filter, and operative to propagate the second set of colors of visible light on to the second chrominance sensor array.

11. The imaging system of claim 10, wherein a first sensor element of the first chrominance sensor array is spatially offset with reference to a corresponding first sensor element of the second chrominance sensor array.

12. The imaging system of claim 10, wherein at least one of the first and second filters is a Bayer color filter.

13. The imaging system of claim 10, wherein the first optical filter is a green-red modified Bayer color filter, the second optical filter is a red-green-blue Bayer color filter, and a third optical filter is a blue-green modified Bayer color filter.

14. The imaging system of claim 10, wherein at least one of the first and second filters is configured in size to provide a desired depth of field of the imaging system.

15. The imaging system of claim 10, wherein at least one of the first and second chrominance sensor arrays is configured in size to provide a desired depth of field of the imaging system.

16. The imaging system of claim 10, wherein at least one of the first and second lenses is configured to provide an optimum modulation transfer function (MTF) at an off-axis location on a corresponding one of the first and second chrominance sensor arrays.

17. The imaging system of claim 9, further comprising:
A third chrominance sensor array operative to produce third pixelated chrominance information from a third sub-spectrum of visible light.

18. The imaging system of claim 9, wherein the first and second sets of colors of visible light are different.

19. An imaging system comprising:
a first luminance sensor array operative to produce first pixelated luminance information from a full spectrum of visible light;
a first chrominance sensor array operative to produce a first pixelated chrominance information from a first set of colors of visible light;
a second chrominance sensor array operative to produce second pixelated chrominance information from a second set of colors of visible light;
a first filter optically coupled to the first chrominance sensor array having a first mosaic pattern using the first set of colors; and
a second filter optically coupled to the second chrominance sensor array having a second mosaic pattern using the second set of colors, at least one of the colors in one of the first set or the second set being different from the colors in the other one of the first set or the second set, wherein the first pixelated luminance information and the first and second pixelated chrominance information are combined to generate an image of an object,
wherein the mosaic pattern of the first filter is spatially offset with reference to the mosaic filter pattern of the second filter.

20. A method of imaging using an imager having first, second and third sensors, the method comprising:
filtering, by a first optical filter having a first mosaic pattern of a first set of colors, the first set of colors of visible light;
generating, by the first sensor, first chrominance information of an object to be imaged based on the first set of colors of visible light incident on the first sensor;
generating by the second sensor, luminance information of the object to be imaged;
filtering, by a second optical filter having a second mosaic pattern of a second set of colors, the second set of colors of visible light; and
generating by the third sensor, second chrominance information of the object to be imaged based on the second set of colors of visible light incident on the third sensor; and
combining the first and second chrominance information and luminance information to generate an image of the object.

21. A method of imaging using an imager having at least first and second sensors, the method comprising:
filtering, by a first filter having a first mosaic pattern of a first set of colors, the first set of colors of visible light;
generating by the first sensor, first chrominance information of an object to be imaged based on the first set of colors of visible light incident on the first sensor;
filtering, by a second filter having a second mosaic pattern of a second set of colors, the second set of colors of visible light;
generating by the second sensor, second chrominance information of the object to be imaged based on the second set of colors of visible light incident on the second sensor; and
combining the first and second chrominance information to generate an image of the object to be imaged.

22. The method of claim 21, further comprising:
providing a third sensor;
obtaining from the third sensor, a third chrominance information of the object to be imaged; and
combining the third chrominance information with the first and second chrominance information to generate the image of the object to be imaged.

23. The method of claim 21, further comprising:
providing a third sensor;
obtaining from the third sensor, luminance information of the object to be imaged; and
combining the luminance information with the first and second chrominance information to generate the image of the object.

24. An imaging system comprising:
a first luminance sensor array operative to produce first pixelated luminance information from a full spectrum of visible light;
a first chrominance sensor array operative to produce first pixelated chrominance information from a first set of colors of visible light;
a second chrominance sensor array operative to produce second pixelated chrominance information from a second set of colors of visible light;
a first filter optically coupled to the first chrominance sensor array having a first mosaic pattern using the first set of colors; and
a second filter optically coupled to the second chrominance sensor array having a second mosaic pattern using the second set of colors, at least one of the colors in one of the first set or the second set being different from the colors in the other one of the first set or the second set, wherein the first pixelated luminance information and the first and second pixelated chrominance information are combined to generate an image of an object,
wherein at least one of the colors of the first and second set is a common color, and the common color in the first mosaic pattern relative to the first chrominance array is spatially offset with respect to the second mosaic pattern relative to the second chrominance array such that the information of the common color from first and second chrominance arrays is combined.

* * * * *